United States Patent
Hollstein et al.

(10) Patent No.: US 11,325,456 B2
(45) Date of Patent: May 10, 2022

(54) CLUTCH ASSEMBLY WITH VIBRATION DAMPERS AND VEHICLE DRIVE TRAIN

(71) Applicant: Continental Automotive GmbH, Hannover (DE)

(72) Inventors: Armin Hollstein, Pfatter (DE); Thomas Knorr, Tegernheim (DE); Stefan Lauer, Beratzhausen (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 930 days.

(21) Appl. No.: 15/999,802

(22) PCT Filed: Feb. 7, 2017

(86) PCT No.: PCT/EP2017/052654
§ 371 (c)(1),
(2) Date: Aug. 20, 2018

(87) PCT Pub. No.: WO2017/140535
PCT Pub. Date: Aug. 24, 2017

(65) Prior Publication Data
US 2021/0309093 A1    Oct. 7, 2021

(30) Foreign Application Priority Data

Feb. 18, 2016 (DE) ...................... 10 1016 202 540.6

(51) Int. Cl.
| | |
|---|---|
| B60K 6/387 | (2007.10) |
| F02N 15/02 | (2006.01) |
| F16D 3/12 | (2006.01) |
| F16D 13/76 | (2006.01) |
| F16D 21/06 | (2006.01) |
| F16F 15/123 | (2006.01) |

(Continued)

(52) U.S. Cl.
CPC ............. *B60K 6/387* (2013.01); *F02N 15/02* (2013.01); *F16D 3/12* (2013.01); *F16D 13/76* (2013.01);

(Continued)

(58) Field of Classification Search
CPC .. B60K 6/387; B60K 6/48; B60K 2006/4825; F16D 3/12; F16D 13/76; F16D 21/06;
(Continued)

(56) References Cited

U.S. PATENT DOCUMENTS 7,114,585 B2   10/2006   Man et al. ................. 180/65.21
9,221,460 B2   12/2015   Bichler et al.
(Continued)

FOREIGN PATENT DOCUMENTS

| CN | 103826894 A | 5/2014 | ............. B60K 6/387 |
|---|---|---|---|
| CN | 104742721 A | 7/2015 | ............. B60K 6/365 |

(Continued)

OTHER PUBLICATIONS

Chinese Office Action, Application No. 201780012168.6, 15 pages, Jan. 16, 2020.

(Continued)

*Primary Examiner* — Richard M Lorence
(74) *Attorney, Agent, or Firm* — Slayden Grubert Beard PLLC

(57) ABSTRACT

Various embodiments may include a clutch assembly comprising: a first coupling and a second coupling; and a vibration damper with a spring. The first coupling includes a crankshaft connection and a coupling-in element which can be connected to one another in a controlled manner. The second coupling has an output connection and an intermediate element which can be connected to one another in a controlled manner. The spring connects the intermediate element and the coupling-in element to one another.

9 Claims, 2 Drawing Sheets

(51) Int. Cl.
    *H02K 7/00*     (2006.01)
    *H02K 7/108*     (2006.01)

(52) U.S. Cl.
    CPC ........ *F16D 21/06* (2013.01); *F16F 15/12353* (2013.01); *H02K 7/006* (2013.01); *H02K 7/108* (2013.01); *B60Y 2200/92* (2013.01); *B60Y 2400/424* (2013.01); *F16D 2021/0615* (2013.01); *F16D 2021/0623* (2013.01); *F16D 2021/0684* (2013.01); *F16D 2300/22* (2013.01)

(58) Field of Classification Search
    CPC ..... F16D 2021/0623; F16D 2021/0684; F16D 2300/22; F16D 2021/0615; H02K 7/006; H02K 7/108; B60Y 2200/92; B60Y 2400/424; F16F 15/12353; F02N 15/02
    See application file for complete search history.

(56) References Cited

U.S. PATENT DOCUMENTS

| | | |
|---|---|---|
| 9,862,369 B2 | 1/2018 | Park et al. |
| 2003/0079953 A1 | 5/2003 | Carlson et al. .............. 192/48.8 |

FOREIGN PATENT DOCUMENTS

| | | | |
|---|---|---|---|
| CN | 104842998 A | 8/2015 | ............ B60W 20/00 |
| DE | 19934936 A1 | 2/2000 | ............... B60K 6/30 |
| DE | 19941705 A1 | 3/2000 | ............ B60K 6/365 |
| DE | 2895476 A1 | 6/2007 | ............. F16D 21/06 |
| DE | 102008054413 A1 | 6/2010 | ............. F16F 15/12 |
| DE | 102015215153 A1 * | 2/2017 | ............. F16D 21/06 |
| EP | 1361102 A2 | 11/2003 | ............. B60K 17/02 |
| EP | 1830095 A1 | 9/2007 | ............. F16D 25/10 |
| WO | 2017/140535 A1 | 8/2017 | ............. F16D 13/76 |

OTHER PUBLICATIONS

German Office Action, Application No. 102016202540.6, 7 pages, dated Oct. 21, 2016.

International Search Report and Written Opinion, Application No. PCT/EP2017/052654, 15 pages, dated Jun. 20, 2017.

Chinese Office Action, Application No. 201780012168.6, 19 pages, dated Apr. 15, 2019.

* cited by examiner

CLUTCH ASSEMBLY WITH VIBRATION DAMPERS AND VEHICLE DRIVE TRAIN

CROSS-REFERENCE TO RELATED APPLICATIONS

This application is a U.S. National Stage Application of International Application No. PCT/EP2017/052654 filed Feb. 7, 2017, which designates the United States of America, and claims priority to DE Application No. 10 2016 202 540.6 filed Feb. 18, 2016, the contents of which are hereby incorporated by reference in their entirety.

TECHNICAL FIELD

The present disclosure relates to vehicles. Various embodiments may include a clutch or clutch assembly having a vibration damper and/or a vehicle drive train including such a clutch.

BACKGROUND

Hybrid vehicles may have parallel hybrid setups in which an electrical machine and a combustion engine can act equally and separately from one another on an output. With regard to the power flow, the combination of these drive units requires couplings in order to realize different driving states. However, the couplings and the connections to the drive units take up installation space.

SUMMARY

The teachings of the present disclosure may be embodied in parallel hybrid drives with a low installation space requirement can be realized. For example, some embodiments may include a clutch assembly with vibration damper, wherein the clutch assembly has a first coupling (K0) and a second coupling (K1); the first coupling (K0) has a crankshaft connection (K') and a coupling-in element (EK), which can be connected to one another in a controlled manner; the second coupling (K1) has an output connection (G') and an intermediate element (Z), which can be connected to one another in a controlled manner; wherein the vibration damper has a spring (KF), which connects the intermediate element (Z) and the coupling-in element (EK) to one another.

In some embodiments, the vibration damper is formed as a dual-mass flywheel; the crankshaft connection (K') is provided with a mass which is a primary mass of the dual-mass flywheel; the intermediate element (Z) is provided with a mass which represents a secondary mass of the dual-mass flywheel, and the spring (KF) is a spring element of the dual-mass flywheel, the spring element connecting the primary mass to the secondary mass.

In some embodiments, the crankshaft connection (K') is provided with an additional flywheel mass wheel (M1), which is connected to the crankshaft connection (K') for rotation therewith, or the crankshaft connection has a portion that has a flywheel mass.

In some embodiments, the intermediate element (Z) is provided with an additional flywheel mass wheel (M2O), which is connected to the intermediate element (Z) for rotation therewith, or the output connection has a portion that has a flywheel mass.

In some embodiments, the coupling-in element (EK) has a belt running surface (R) or a portion that is part of a rotor of an electrical machine.

In some embodiments, the belt running surface (R) or the portion that is part of a rotor of an electrical machine reaches peripherally around the remaining coupling-in element, the spring and the intermediate element for the most part or completely.

In some embodiments, the first coupling (K0) and the second coupling (K1) are friction couplings or dog couplings.

In some embodiments, the first coupling and the second coupling in each case have an actuator, which is displaceable in an axial direction of the clutch assembly, and the position of which defines the operating state of the respective coupling.

As another example, some embodiments may include a vehicle drive train with a combustion engine, an electrical drive, an output and a clutch assembly as described above, wherein the combustion engine has a crankshaft, which is connected to the crankshaft connection (K') of the combustion engine, the electrical drive is connected to the coupling-in element (EK), and the output is connected to the output connection (G').

As another example, some embodiments may include a vehicle drive train with a control device (C), which is connected to the clutch assembly in an activating manner and which is designed to set the clutch assembly according to one of the following states of the control device (C): a starting state, in which the first coupling (K0) is closed and the second coupling (K1) is open; a recuperation state, in which the first coupling (K0) is open and the second coupling (K1) is closed; and a driving state, in which the first coupling (K0) is closed and the second coupling (K1) is closed.

DETAILED DESCRIPTION

Figure 1:
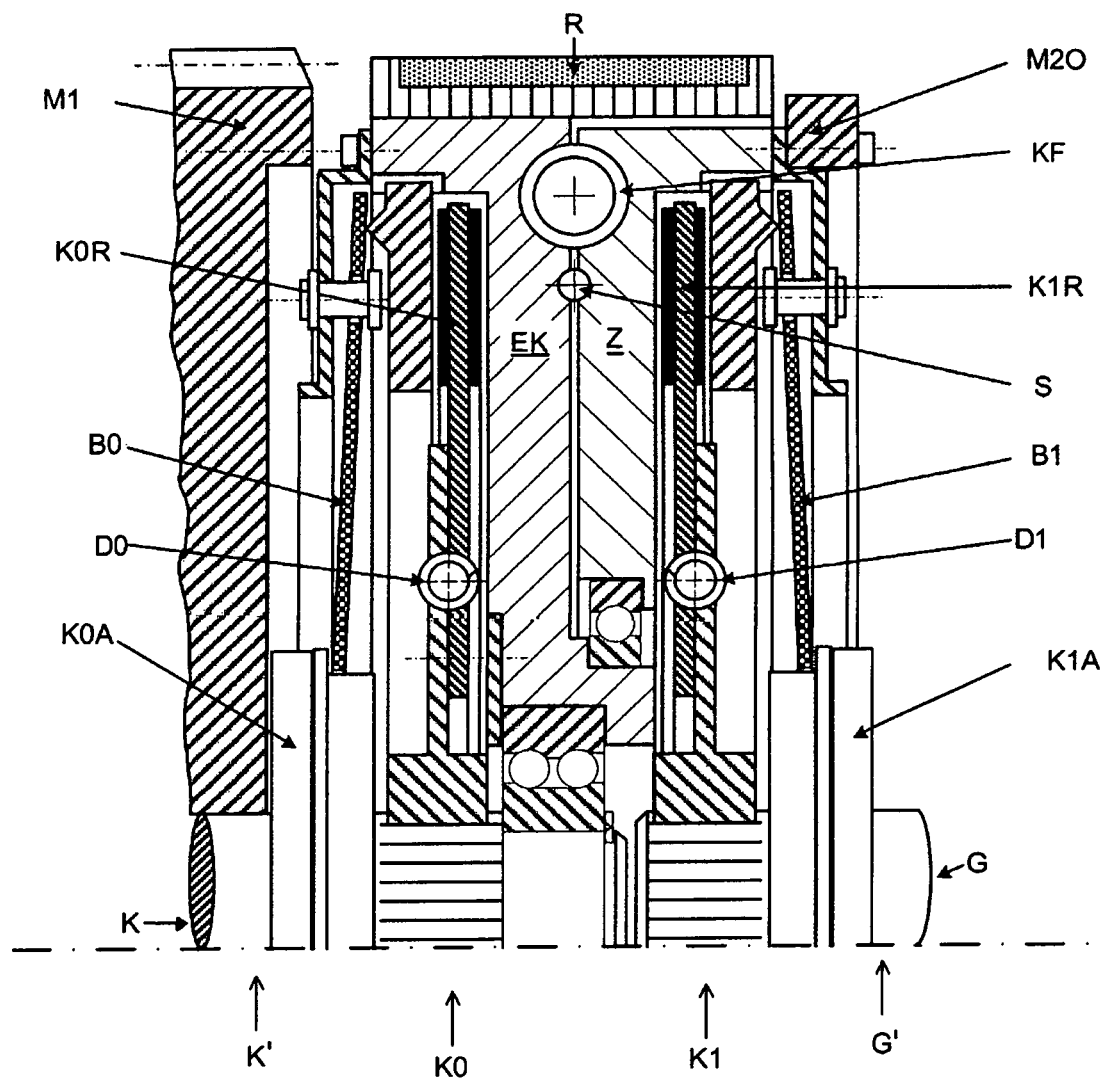
FIG. 1 serves is a drawing showing an example embodiment of the clutch assembly according to the teachings of the present disclosure.

The teachings of the present disclosure describe a clutch assembly and a vehicle drive train having an integration of elements of a vibration damper, such as a dual-mass flywheel, within the clutch assembly. In some embodiments, the clutch assembly has a first coupling and a second coupling, which realize the usual function of couplings, in particular the controllability of mechanical connections, e.g. torque-transmitting connections. As a result, the transmitted torques or rotational movements can be controlled. In some embodiments, the clutch assembly has a spring (in particular a combination of a number of springs), which connects the elements of the couplings to one another. This produces a vibration damper, which in particular in the sense of a dual-mass flywheel. The mass of the elements of the couplings is used together with the spring to realize vibration damping. Therefore, torsional vibrations that occur during the operation of a combustion engine can be reduced by means of the spring within the clutch assembly. Further damping measures, for instance a dual-mass flywheel which is only connected to the combustion engine for the purpose of vibration damping, are therefore not required or can be given smaller dimensions. A spring refers in particular to a spring combination, i.e. a combination of a number of spring elements.

In some embodiments, the spring elements are connected parallel to one another. In some embodiments, each spring element connects a coupling-in element and an intermediate element (as shown below) or the first coupling to the second coupling. Also referred to as a "spring" are one or more spring elements that extend in particular in the circumferential direction around an axis of rotation of the clutch assembly. In some embodiments, the spring or the spring elements may be designed like a spring or spring elements of a dual-mass flywheel. In some embodiments, the spring is arranged between the first coupling and the second coupling. The spring (unlike spring elements of a dual-mass flywheel) is arranged between the crankshaft connection and the output connection of the clutch assembly. On the other hand, not only is the (geometrical) arrangement notable, but also the connection sequence: The spring is connected between the first coupling and the second coupling of the clutch assembly (in particular a P2 clutch, as explained in more detail below).

In some embodiments, a clutch assembly with a vibration damper is for use in a drive train of a motor vehicle, in particular in a hybrid drive train, which has an electrical drive unit and a drive unit with a combustion engine. In some embodiments, the clutch assembly is used in a parallel hybrid drive train. The clutch assembly has two couplings. These couplings are designed to couple the electrical drive unit and the combustion-engine drive unit in a parallel way to an output (or to a transmission of an output).

"In a parallel way" means that the clutch assembly is capable on the one hand of connecting the electrical drive unit to the output, and on the other hand additionally the combustion-engine drive unit to the output. The torque-transmitting connections can therefore act on the output in parallel. On account of the two couplings, this topology is referred to as a P2 drive train, "P" standing for parallel and "2" standing for the arrangement of an electrical machine on the transmission output shaft or output shaft. An electrical drive unit is understood as meaning not only units that are designed to deliver traction power to the output but also drive units that can drive a combustion engine when starting and can operate as a generator, for instance starters/generators.

On account of the two couplings, apart from a driving state in which two drive units act on the output, a recuperation mode, a starting state, and possibly further driving states such as a cruising state, a VM driving state, an E driving state and also a parking state, can be set. In the starting state, the electrical drive unit is connected to the combustion-engine drive unit and the output is decoupled. In the cruising state, the output is decoupled and at least one of the drive units is inactive, in particular both drive units.

In the VM driving state ("VM" stands for "Verbrennungsmotor" (combustion engine)), the combustion-engine drive unit is connected to the output, the electrical drive unit being inactive. In the optional E driving state ("E" stands for "electrical machine"), the electrical drive unit is connected to the output. The combustion-engine drive unit is in this case decoupled and in particular inactive. The electrical drive unit is in particular a starter generator (no E driving state being provided), but may also be realized by means of some other electrical machine. In the parking state, the combustion engine and the electrical drive are inactive. The parking state is optional. The combustion-engine drive unit is realized by means of a combustion engine. Unless otherwise stated, the terms "coupled", "decoupled", "disconnected", "connected" and the like relate to torque-transmitting connections.

In some embodiments, the clutch assembly has a first coupling and a second coupling. The couplings are connected in series. In some embodiments, the clutch assembly has two connections, which are intended for connection to the output (or its transmission) and to the combustion engine drive unit (or the combustion engine, i.e. its crankshaft). Provided for attaching the electrical drive unit is a coupling-in element, which from a topological viewpoint can be regarded as a connection. The two couplings are controllable, as their connecting state (disconnected/connected) can be set by an external signal (for instance a mechanical or electrical signal).

The first coupling therefore has a crankshaft connection. In some embodiments, the first coupling has a coupling-in element. The first coupling is designed to connect (or disconnect) the crankshaft connection to the coupling-in element in a controlled manner. The second coupling has an output connection. Furthermore, the second coupling has an intermediate element. The second coupling is designed to connect the output connection to the intermediate element in a controlled manner.

In some embodiments, the clutch assembly includes a vibration damper. The vibration damper comprises a spring, which is realized in particular as a combination of a number of springs. The spring serves for the coupling and can be referred to as a coupling spring. The spring connects or couples the intermediate element to the coupling-in element. In some embodiments, the spring connects or couples the first coupling to the second coupling. The spring connects the sides or elements of the couplings that are opposed to the connections. One of these sides is represented by the coupling-in element. The coupling-in element is provided on that side of the coupling on which the spring acts or on which the spring is connected to the second coupling (or its intermediate element).

In some embodiments, the spring (or the intermediate element and/or bearing points of the intermediate element and/or of the coupling-in element) may be physically integrated in the clutch assembly. In some embodiments, inner portions of the coupling-in element are integrated within the outer portion of the coupling-in element. This applies in particular to portions of the coupling-in element that have a coupling function. Furthermore, portions that have coupling functions, for instance friction lining disks or dog portions, may be physically integrated in the clutch assembly. Portions that have coupling functions lie within a circumferential portion (of the coupling-in element) (within an outer portion of the coupling-in element that is designed to accept a torque of an electrical machine).

In some embodiments, the spring may be located (in the axial direction of the clutch assembly) between the two couplings. In particular, the spring may be located in a clearance of the coupling-in element, in a clearance of the intermediate element or within both. The clearance or the clearances may open in the axial direction. The spring may be peripherally enclosed by a (circumferential) portion of the coupling-in element. In some embodiments, the spring is arranged completely within the clutch assembly. Moreover, a peripheral outer portion of the coupling-in element, in particular a belt running surface (R) or a portion that is part of a rotor of an electrical machine, preferably reaches around the first coupling and/or the second coupling completely (or at least for the most part). In some embodiments, a peripheral outer portion of the coupling-in element, in particular the belt running surface (R) or the portion that is part of a rotor of an electrical machine, preferably reaches around the intermediate element completely (or at least for the most part).

In some embodiments, the (peripheral) outer portion of the coupling-in element, in particular the belt running surface (R) or the portion that is part of a rotor of an electrical machine, preferably also reaches around bearing points of the coupling-in element and/or of the intermediate element within the clutch assembly completely (or at least for the most part). In some embodiments, the spring and furthermore possibly also the intermediate element (completely or partially) and possibly also at least one of the bearing points are accommodated in the clutch assembly.

In some embodiments, the spring and the intermediate element (completely or partially) and at least one of the bearing points are arranged within the peripheral outer portion of the coupling-in element (i.e. seen in the radial direction and in the axial direction). Also seen in the axial direction, the (peripheral) outer portion of the coupling-in element may reach around at least the spring, the intermediate element and/or at least one of the bearing points completely or at least for the most part. By at least one of these measures, a high degree of physical integration can be achieved. Furthermore, the stated inner parts of the clutch assembly are protected from external influences.

In some embodiments, the connection or linkage (in particular between the couplings) by means of the spring provides a vibration damper for the torque transmission. If the first and second couplings are closed (i.e. a torque is transmitted from the crankshaft connection to the output connection), a torque coupled in by way of the crankshaft connection is transmitted by way of the spring. The spring may be adapted to the torque spectrum to be transmitted, in order to achieve a damping effect. The masses of the elements or of the crankshaft connection may be taken into consideration here as (part of) primary and secondary masses. These primary and secondary masses together with the spring that connects them provide a dual-mass flywheel.

In some embodiments, the primary mass substantially comprises the mass of the crankshaft connection, possibly including the mass of the crankshaft and the parts fastened thereto, or including the mass of the coupling-in element and possibly parts fastened thereto. If an additional mass or a part is fastened to the crankshaft or to the crankshaft connection and/or to the coupling-in element of the clutch assembly, it is part of the primary mass. An additional mass allows the primary mass to be deliberately increased.

In some embodiments, the secondary mass substantially comprises the mass of the intermediate element, including the mass of the output connection and possibly including the output. If a part or an additional mass is fastened to the output connection or to the output or to the intermediate element, it is part of the secondary mass. An additional mass allows the secondary mass to be deliberately increased.

In some embodiments, the crankshaft connection or the crankshaft (more generally: the crankshaft and/or the first coupling coupled to it) may include an additional flywheel mass wheel. The flywheel mass wheel forms an additional mass, as already mentioned. The flywheel mass wheel (of the first coupling) is physically independent of the crankshaft connection or the crankshaft. The flywheel mass wheel is connected to the crankshaft connection or to the crankshaft for rotation therewith.

In some embodiments, the crankshaft connection (or the crankshaft) has a portion that forms a flywheel mass. This portion is made sturdier than maximum loading of the clutch assembly requires. In some embodiments, this portion extends in the radial direction to achieve a higher moment of inertia than a shaft that is only designed for torque transmission. The radial distance over which the portion extends may be greater than the radial distance over which the portion extends, e.g. by at least a factor of 2, 3 or 4. This may also apply to the flywheel mass wheel of the first coupling. The measures mentioned in this paragraph concern a primary mass of a dual-mass flywheel.

In some embodiments, the intermediate element or the output or an output shaft (more generally: the intermediate element and/or the second coupling connected to it) may include an additional flywheel mass wheel. This flywheel mass wheel forms in particular an additional mass, as already mentioned. In some embodiments, the flywheel mass wheel (on the second coupling) is physically independent of the output connection or that of the output (or of an output shaft). The flywheel mass wheel of the second coupling may be connected to the output connection or to the output or an output shaft for rotation therewith.

In some embodiments, the output connection (or the output or the output shaft) has a portion that forms a flywheel mass (of the second coupling). This portion is made sturdier than maximum loading of the clutch assembly requires. In particular, this portion extends in the radial direction to achieve a higher moment of inertia than a shaft that is only designed for torque transmission. The radial distance over which the portion extends may be greater than the radial distance over which the portion extends, e.g. by at least a factor of 2, 3 or 4. This may also apply to the flywheel mass wheel of the second coupling. The measures mentioned in this paragraph concern a secondary mass of a dual-mass flywheel.

In some embodiments, the crankshaft connection or the crankshaft or the coupling-in element and/or the intermediate element or the output connection or the output shaft are designed according to a maximum or standard torque loading, this concerning in particular the cross section, and may furthermore have an additional mass. This additional mass is provided by a dedicated body or by a dedicated structural part that is connected to the component concerned.

In some embodiments, the additional mass is formed by an additional portion of the component concerned that reinforces the latter beyond the design. The reinforcement, i.e. the design with a greater cross section, for instance in the form of a thickening or a disk portion, allows an increase of the moment of inertia. The reinforcement does not serve primarily for increasing the torque loadability, this is just a side effect. In particular, an inner portion of the crankshaft connection or of the crankshaft or of the coupling-in element and/or of the intermediate element or of the output connection or of the output shaft may be designed according to a maximum or standard torque loading, while a portion connected thereto realizes the additional mass. The additional mass may be arranged at a greater radial distance from the axis of rotation of the component concerned than that portion or that component which is designed for the torque transmission according to the maximum or standard torque loading.

A basic portion is consequently designed according to a maximum or standard torque loading and an additional portion is designed according to the realization of a desired primary and secondary mass. The additional portion goes (physically) beyond the basic portion, which is designed according to a maximum or standard torque loading. The crankshaft connection, the crankshaft or the coupling-in element and/or the intermediate element or the drive connection and/or the output shaft has a moment of inertia that is at least 20%, 40%, 80% or at least 100%, 150%, 200% or 300% greater than the moment of inertia of a corresponding (imaginary) component that is designed according to a maximum or standard torque loading. In particular, the crankshaft connection, the coupling-in element and/or possibly the crankshaft has a moment of inertia that is at least 100%, 150%, 200%, 300% or 400% greater than the moment of inertia of a corresponding (imaginary) component which is designed according to a maximum or standard torque loading. The design referred to relates in particular to the radius, the cross-sectional shape and/or the cross-sectional area of the component concerned.

In some embodiments, the additional masses or flywheels described here are arranged in a clutch housing of the clutch assembly. Furthermore, the spring may be located completely within the clutch assembly or completely within one or more elements of the clutch assembly. As a result, the installation space requirement can be minimized, in particular in the axial direction. The spring may in particular be arranged together with the couplings in the same clutch housing.

In some embodiments, the output connection may be arranged outside the coupling-in element, i.e. the coupling-in element may also not reach around the output connection, so that the output connection is offset axially in relation to the coupling-in element (in particular in relation to the belt running surface or in relation to the rotor of the electrical machine). The coupling-in element may have a belt running surface. This is the case in particular if the clutch assembly is designed for attachment (of the coupling-in element) by means of a belt. If, for example, a belt starter/generator is used as the drive, then the coupling-in element has a belt running surface or a belt wheel.

In some embodiments, the coupling-in element may be designed for the connection of an integrated starter/generator, in particular a belt generator. The coupling-in element may have a portion that is part of a rotor of an electrical machine or of an electrical drive. If the clutch assembly is integrated with the electrical drive, the rotor of the electrical machine may be regarded as part of the clutch assembly, since a part of the rotor forms a part of the coupling-in element. Furthermore, the coupling-in element may have a portion that is connected to a fastening element which is designed for connection to a rotor of an electrical machine.

In some embodiments, the belt running surface or the portion that is part of a rotor of an electrical machine (or else the rotor itself) may reach peripherally around the spring (in particular also the remaining coupling-in element and/or the intermediate element or bearing points of the coupling-in element and of the intermediate element) for the most part or completely. The remaining coupling-in element is the coupling-in element without the belt running surface or without the portion of the rotor or without the rotor itself.

In some embodiments, seen in the axial direction, the belt running surface or the portion that is part of a rotor of an electrical machine reaches peripherally around the remaining coupling-in element, the spring, the first and/or the remaining second coupling, bearing points of the coupling-in element and of the intermediate element and/or the intermediate element itself for the most part or completely. The remaining second coupling is the second coupling without the belt running surface or without the portion of the rotor or without the rotor itself.

In some embodiments, the first coupling and the second coupling may be friction couplings or dog couplings. In the case of dog couplings, an activation of the electrical machine or of the electrical drive may reduce the speed difference within the coupling or couplings substantially to zero before the coupling or couplings are closed. In some embodiments, there is such a synchronization or a synchronizing control connection between the activation of the electrical machine and the activation of the clutch assembly.

In some embodiments, the first coupling and the second coupling may in each case have an actuator. Properties of one of the actuators that are applicable to both actuators are mentioned below. The position of the actuator can be changed. The actuator has a "closed" position and an "open" position. In the "closed" position, the coupling assigned to the actuator is closed. In the "open" position, the coupling assigned to the actuator is open. The actuator is displaceable in an axial direction of the clutch assembly. The two positions are provided at different axial positions. The position of the actuator defines the operating state of the respective coupling. The actuator has springs, in particular leaf springs. These are designed to exert a force in the direction of the "closed" position. The actuator may be a mechanical, electromechanical, hydraulic or electrohydraulic actuator. The actuator of the first coupling and the actuator of the second coupling can in each case be set independently of the other actuator.

Some embodiments include a vehicle drive train with a combustion engine, an electrical drive, an output and a clutch assembly as described above. The combustion engine has a crankshaft. This may be connected directly to the crankshaft connection of the combustion engine. The electrical drive may be connected directly to the coupling-in element. The output is connected to the output connection. The output may have a transmission, in particular a manually shifted transmission. The crankshaft connection and/or the crankshaft may have a flywheel or some other additional flywheel mass, which is arranged on it or fastened to it. The output may also have a flywheel or some other additional flywheel mass.

In some embodiments, the flywheel, parts or portions thereof or the other additional flywheel mass may be located within a clutch housing, within which the clutch assembly is also located. The combustion engine, the starter generator and the output or its transmission are not arranged within the clutch housing. The vehicle drive train may have a control device, which is connected in an activating manner to the clutch assembly. The control device may also be part of the clutch assembly.

In some embodiments, the control device is designed to set the clutch assembly according to one of the following states of the control device:
  a starting state, in which the first coupling is closed and the second coupling is open;
  and
  a driving state, in which the first coupling is closed and the second coupling is closed.

In the driving state, the combustion engine is coupled to the output.

In some embodiments, the control device may be designed furthermore to set the clutch assembly according to one of the following states of the control device:
  a recuperation state, in which the first coupling is open and the second coupling is closed;

The control device may also be designed to set the clutch assembly to the following state of the control device:
  a cruising state, in which the first and second couplings are open.

In a VM driving state, for the setting of which the control device is designed, both couplings are closed and the electrical drive is inactive or operates as a generator, while the combustion engine is active. The VM driving state may be regarded as a substate of the driving state. In an optional E driving state, for the setting of which the control device is designed, the first coupling is open and the second coupling is closed. The combustion engine is active or inactive. The electrical drive may be a drive that drives the combustion engine (for starting it) and/or is designed to deliver traction power to the output, in order to drive the vehicle, and/or is designed to operate as a generator. The electrical drive may also be a drive that is only designed for starting the combustion engine and also for operation as a generator. In this case, the electrical drive corresponds to a starter generator.

In an optional E driving state, for the setting of which the control device is designed, the first coupling is open and the second coupling is closed. The combustion engine is in this case inactive or active (for instance for generating a negative pressure for a brake booster and/or for safety reasons), while the electrical drive is active and generates traction power. The E driving state may be regarded as a substate of the driving state.

In an optional parking state, both couplings are closed and the combustion engine and also the electrical drive are inactive.

In some embodiments, the electrical drive may be a drive that drives the combustion engine (for starting it) and/or is designed to deliver traction power to the output, in order to drive the vehicle, and/or is designed to operate as a generator. The electrical drive may also be a drive that is only designed for starting the combustion engine and also for operation as a generator. In this case, the electrical drive corresponds to a starter generator. The term "electrical drive" does not restrict the component concerned to components that are designed exclusively for driving, but refers to one of several functions, specifically that of the drive (i.e. generating traction power), the component preferably also being designed for operation as a generator.

In some embodiments, the first coupling and the second coupling may have damping springs, which are for instance seated in friction lining disks of the couplings (formed as friction brakes). The damping springs may damp the friction lining disks during the coupling-in process.

In FIG. 1, a clutch assembly is represented. A crankshaft K is connected to a first coupling K0 by way of a schematically represented crankshaft connection K'. The crankshaft connection K' leads by way of a first actuator K0A to a coupling-in element EK of the first coupling. The position of the actuator K0A of the first coupling K0 defines whether or not the crankshaft connection K' is connected to the coupling-in element EK.

A first leaf spring B0 (which belongs to the first coupling K0) presses the crankshaft connection K' against the coupling-in element EK. As a result, the first leaf spring B0 defines the basic position of the first coupling.

A friction lining disk KOR of the first coupling K0 is provided between the coupling-in element EK and the crankshaft connection K'. Depending on the position of the actuator K0A of the first coupling K0, a torque is or is not transmitted from the crankshaft connection K' to the coupling-in element EK by way of the friction lining disk KOR. Provided on the friction lining disk KOR is a damping spring D0, which damps the friction lining disk KOR during the coupling-in. A mounting of the friction lining disk KOR is seated on a short shaft, at the end of which a rolling bearing provides at least a radial bearing arrangement (or else an axial bearing arrangement). This bearing arrangement is referred to at the beginning from a topological viewpoint as a bearing point.

The coupling-in element EK has a disk-shaped portion, on which the friction lining disk KOR exerts a force when the first coupling K0 is closed. This portion realizes a coupling function. In the same way, the crankshaft connection K' has a disk-shaped portion, on which the friction lining disk KOR exerts a force when the first coupling K0 is closed. Also this portion realizes a coupling function. Together with the friction lining disk KOR, these portions form the torque-transmitting components of the first coupling K0.

The coupling-in element EK also has a cylindrical portion, which serves for the attachment of an electrical machine. A cylindrical portion is represented as an independent structural part, which is fixedly connected to the disk-shaped portion of the coupling-in element EK. The coupling-in element EK has a belt running surface R. This is located on an outer side of the cylindrical portion or of the coupling-in element EK. The cylindrical portion and the disk-shaped portion may also be configured as one part.

A further rolling bearing supports an intermediate element Z on a projection of the coupling-in element EK. The intermediate element Z and an output connection G' are part of a second coupling K1. This second coupling K1 comprises furthermore a friction lining disk K1R, which together with the portions of the intermediate element Z and of the output connection G' form the coupling function of the second coupling or can transmit a torque. Also the friction lining disk K1R (like the friction lining disk KOR) has a damping spring Dl. The friction lining disk K1R is supported by way of a mounting with respect to one end of a short shaft of the second coupling.

The coupling-in element EK is supported by way of a support S (in particular a rolling bearing) with respect to the intermediate element Z. This support S acts in particular in the axial direction of the clutch assembly. Apart from the disk-shaped portion of the intermediate element Z, it has a cylindrical portion. This cylindrical portion is surrounded by the cylindrical portion of the coupling-in element. This rolling bearing or bearing arrangement is referred to at the beginning from a topological viewpoint as a bearing point.

The second coupling K1 has an actuator K1A, which can be displaced axially and the position of which defines whether or not the intermediate element Z (or its disk-shaped portion) and the output connection G' (or its disk-shaped portion) are coupled in a torque-transmitting manner by way of the friction lining disk K1R. The output connection G' is adjoined by an output shaft G' (which may be designed as a transmission shaft).

A spring KF, which may also be referred to as a coupling spring, connects or couples the intermediate element Z to the coupling-in element EK. The spring KF may consist of a number of spring elements, which are peripherally arranged, which are connected between the intermediate element Z and the coupling-in element EK, and which occupy in each case a segment of a circle. Clearances are respectively provided in the intermediate element Z and the coupling-in element EK. These clearances are facing one another. The spring KF is located in the clearances or in the overall clearance that is obtained by the clearances of the two components. The overall clearance has the shape of a torus. The clearances have in each case the shape of a half-torus, i.e. a torus with a semicircle as the cross section. The spring similarly extends along a torus. The spring KF serves for vibration damping during the transmission of torque from one coupling to the other.

In order to provide a primary mass, an additional crankshaft mass M1 is fastened to the crankshaft connection K', in particular to the crankshaft K. Functionally, the primary mass is part of the clutch assembly. The primary mass is formed as a mass flywheel, and is in particular disk-shaped. The additional crankshaft mass M1 (also functionally referred to as the primary mass) has a clearance, in which a part of the actuator KOA of the first coupling is arranged (and also a part of the crankshaft connection K'). The clearance is open toward the first coupling.

To provide a secondary mass, an (optional) additional mass M2O is fastened to the intermediate element Z. The additional mass M2O is formed in the shape of a ring. The ring has a rectangular cross section. Together with the intermediate element Z, the secondary mass. If the mass or the moment of inertia of the intermediate element Z is sufficient, no additional mass M2O is required.

The spring KF forms a vibration damper. The primary mass M1 forms a (primary) moment of inertia for the torque fluctuations of the combustion engine, which are passed on by way of the crankshaft connection to the coupling device. The spring KF damps these fluctuations in the sense of a low-pass filter; the primary mass M1 serves similarly for vibration damping in the sense of an averaging of the torque. The secondary mass in the form of the intermediate element Z and possibly the mass fastened thereto continue to damp the vibrations transmitted by way of the spring KF. A third-order low-pass filter is obtained. The masses or the moments of inertia upstream of the spring KF (as seen from the crankshaft connection) may be regarded as the primary mass. The masses or the moments of inertia downstream of the spring KF (as seen from the crankshaft connection) may be regarded as the secondary mass. In some embodiments, the resonant frequency, which is defined by the (torsion) spring stiffness of the spring KF and the moments of inertia of the masses upstream and downstream of the spring (i.e. the primary and secondary masses), lies well below the idling speed of the combustion engine.

Figure 2:
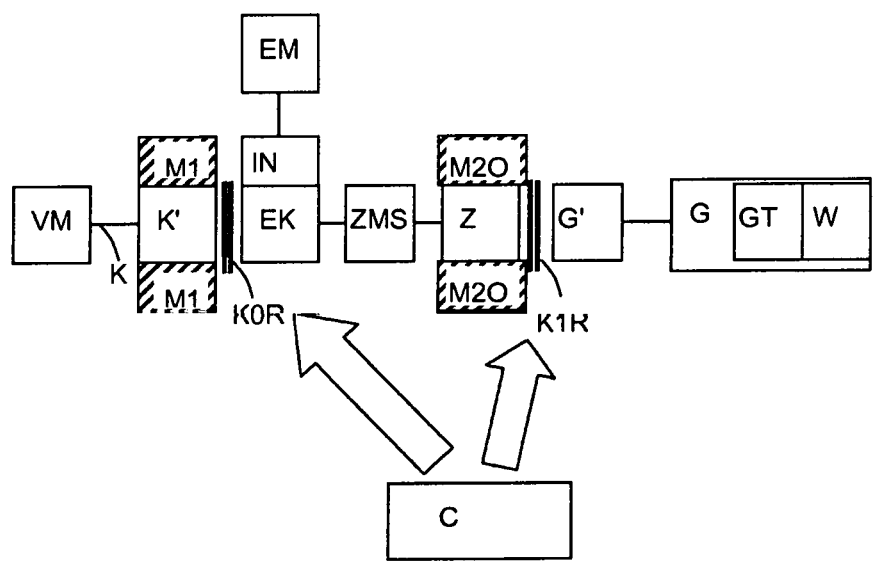
FIG. 2 is a drawing showing a schematic structure tor explaining the clutch assembly and the vehicle drive train according to the teachings of the present disclosure.

FIG. 2 schematically shows a vehicle drive train with a combustion engine VM and a crankshaft K. The combustion engine VM is connected to a crankshaft connection K' by way of the crankshaft K. Connected to the crankshaft connection K' is an additional crankshaft mass M1, which as the primary mass represents a moment of inertia. This acts on the crankshaft connection.

The crankshaft connection K' is connected by way of a friction lining disk KOR to a coupling-in element EK. The first coupling comprises the crankshaft connection K', the friction lining disk KOR and also the coupling-in element EK. The crankshaft connection K' is switchably connected to the coupling-in element EK, so that, apart from the function as a mechanical connection or for coupling-in, these components also have the function of a coupling. The coupling-in element EK has an input IN, which serves for the connection to an electrical machine EM. Here, a part of the rotor of the electrical machine EM may operate as an input IN, in that it is fixedly connected to the coupling-in element EK.

The coupling-in element EK, and consequently the first coupling, is adjoined by a spring KF. By way of the latter, the first coupling is coupled to the second coupling. The second coupling comprises an intermediate element Z, a friction lining disk K1R and an output connection G'. The intermediate element Z may be connected by way of the friction lining disk K1R to the output connection G', depending on the state of the second coupling. The intermediate element Z may be connected to an (optional) additional flywheel mass wheel (M2O).

If the first coupling and the second coupling are formed as a dog coupling, the designations KOR, K1R denote the first and second sets of dogs of the first coupling and the second coupling.

The output connection G' is followed by an output G with a transmission GT and wheels W. A control device C activates the states of the first coupling and of the second coupling.

Belonging to the coupling device in particular are the components with the designations K', KOR, EK, IN, KF, Z, K1R and G'; possibly also the components with the designations M1 and M2O. Furthermore, the control device C belongs to the coupling device.

The designation IN refers generally to an input, which in FIG. 1 is specified as a belt running surface R (and which may also be realized as part of a rotor or as a rotor fastening element).

Apart from the components of the coupling device, belonging to the vehicle drive train are the components with the designations VM, K, EM, G, and possibly GT and/or W. Belonging to the vehicle drive train in particular is the control device C.

In one embodiment, the control device C also activates the combustion engine VM and/or the electrical machine EM, at least with regard to the speed.

The spring KF forms the vibration damper; together with the moment of inertia of the masses M1 and possibly M2O, or the components connected thereto, this forms a dual-mass flywheel.

What is claimed is:

1. A clutch assembly comprising:
   a first coupling and a second coupling; and
   a vibration damper with a spring;
   wherein the first coupling includes a crankshaft connection and a coupling-in element which can be connected to one another in a controlled manner;
   wherein the coupling-in element comprises a belt running surface or a portion of a rotor of an electrical machine;
   the second coupling has an output connection and an intermediate element which can be connected to one another in a controlled manner;
   wherein the spring connects the intermediate element and the coupling-in element to one another.

2. The clutch assembly as claimed in claim 1, wherein:
   the vibration damper comprises a dual-mass flywheel;
   the crankshaft connection includes a mass comprising a primary mass of the dual-mass flywheel;
   the intermediate element includes a mass comprising a secondary mass of the dual-mass flywheel; and
   the spring comprises a spring element of the dual-mass flywheel connecting the primary mass to the secondary mass.

3. The clutch assembly as claimed in claim 1, wherein the crankshaft connection comprises an additional flywheel mass wheel connected to the crankshaft connection for rotation therewith, or the crankshaft connection includes a portion with a flywheel mass.

4. The clutch assembly as claimed in claim 1, wherein the intermediate element comprises an additional flywheel mass wheel connected to the intermediate element for rotation therewith, or the output connection includes a portion with a flywheel mass.

5. The clutch assembly as claimed in claim 1, wherein the belt running surface or the portion of a rotor reaches peripherally around the remaining coupling-in element, the spring, and the intermediate element at least for the most part.

6. The clutch assembly as claimed in claim 1, wherein the first coupling and the second coupling comprise friction couplings or dog couplings.

7. The clutch assembly as claimed in claim 1, wherein the first coupling and the second coupling in each case include an associated actuator displaceable in an axial direction of the clutch assembly, and the position of the respective actuator defines an operating state of the respective coupling.

8. A vehicle drive train comprising:
a combustion engine;
an electrical drive;
an output;
a crankshaft; and
a clutch assembly comprising:
a first coupling and a second coupling; and
a vibration damper with a spring;
wherein the first coupling includes a crankshaft connection and a coupling-in element which can be connected to one another in a controlled manner;
the second coupling has an output connection and an intermediate element which can be connected to one another in a controlled manner;
wherein the spring connects the intermediate element and the coupling-in element to one another;
wherein the crankshaft is connected to a crankshaft connection of the combustion engine;
the electrical drive is connected to the coupling-in element and the output is connected to the output connection.

9. A vehicle drive train comprising:
a clutch assembly comprising:
a first coupling and a second coupling; and
a vibration damper with a spring;
wherein the first coupling includes a crankshaft connection and a coupling-in element which can be connected to one another in a controlled manner;
the second coupling has an output connection and an intermediate element which can be connected to one another in a controlled manner;
wherein the spring connects the intermediate element and the coupling-in element to one another;
a control device connected to the clutch assembly in an activating manner and configured to set the clutch assembly according to one of the following states of the control device:
a starting state, in which the first coupling is closed and the second coupling is open;
a recuperation state, in which the first coupling is open and the second coupling is closed;
a driving state, in which the first coupling is closed and the second coupling is closed.

\* \* \* \* \*